US012592766B2

(12) United States Patent
Le et al.

(10) Patent No.: US 12,592,766 B2
(45) Date of Patent: Mar. 31, 2026

(54) GEOGRAPHICALLY-DISTRIBUTED ELECTRONICALLY-STEERED ARRAY ANTENNA SYSTEM FOR GROUND-BASED UPLINK COMMUNICATIONS

(71) Applicant: Panasonic Avionics Corporation, Irvine, CA (US)

(72) Inventors: Ninh Le, Huntington Beach, CA (US); Anh Nguyen, Fullerton, CA (US)

(73) Assignee: Panasonic Avionics Corporation, Irvine, CA (US)

( * ) Notice: Subject to any disclaimer, the term of this patent is extended or adjusted under 35 U.S.C. 154(b) by 330 days.

(21) Appl. No.: 18/489,771

(22) Filed: Oct. 18, 2023

(65) Prior Publication Data
US 2025/0132809 A1    Apr. 24, 2025

(51) Int. Cl.
*H04B 7/185* (2006.01)

(52) U.S. Cl.
CPC .............................. *H04B 7/18508* (2013.01)

(58) Field of Classification Search
CPC .......................... H04B 7/185; H04B 7/18508; H04B 7/18517; H04B 7/18519; H04B 7/18523; H04B 7/18526; H04B 7/18528; H04B 7/18567; H04B 7/18578; H04B 7/18582; H04B 7/18584
See application file for complete search history.

(56) References Cited

U.S. PATENT DOCUMENTS

| | | | |
|---|---|---|---|
| 8,185,045 B2 | 5/2012 | Mansour | |
| 8,964,891 B2 | 2/2015 | Tsofe | |
| 9,485,009 B1 | 11/2016 | Shemesh | |
| 9,583,829 B2 | 2/2017 | Engel et al. | |
| 10,320,471 B1 | 6/2019 | Panthi et al. | |
| 10,396,444 B2 | 8/2019 | Levy et al. | |
| 10,433,262 B1 | 10/2019 | Barnes et al. | |
| 11,152,969 B2 | 10/2021 | Mclain | |
| 11,233,325 B2 | 1/2022 | Greenwood et al. | |
| 11,455,839 B2 | 9/2022 | Lad et al. | |
| 2019/0165856 A1* | 5/2019 | Roy ................... | H04B 7/18513 |

* cited by examiner

*Primary Examiner* — Keith Ferguson
(74) *Attorney, Agent, or Firm* — Perkins Coie LLP

(57) ABSTRACT

Systems, methods, and devices for configuring a wireless telecommunication system are provided. An example method includes converting, at each teleport, one first digital signal of multiple first digital signals into a corresponding first analog signal of multiple first analog signals, each of the multiple first analog signals having a corresponding phase shift, and transmitting, by each teleport, the corresponding first analog signal. A remote processing node, at a location that is remote from each teleport, is configured to determine a corresponding delay in a second digital signal of multiple second digital signals from the corresponding phase shift, the multiple second digital signals corresponding to multiple second analog signals received by each teleport, the corresponding delay being determined based on coherently combining multiple third analog signals, and each of the multiple third analog signals being generated by converting a corresponding second digital signal of the multiple second digital signals.

20 Claims, 6 Drawing Sheets

GEOGRAPHICALLY-DISTRIBUTED ELECTRONICALLY-STEERED ARRAY ANTENNA SYSTEM FOR GROUND-BASED UPLINK COMMUNICATIONS

TECHNICAL FIELD

This document is generally related to systems, methods, and apparatus to improve connectivity in commercial passenger vehicles such as airplanes, passenger trains, buses, cruise ships, and other forms of transportation.

BACKGROUND

Commercial travel has evolved with the increasing popularity of personal electronic devices (PEDs) that passengers carry on board, as well as media play devices provided in commercial passenger vehicles. Techniques that provide reliable connectivity in commercial passenger vehicles with minimal or no disruption will enhance a positive travel experience.

SUMMARY

This patent document describes, among other things, various implementations for improving connectivity for commercial passenger vehicles. In an example, this is achieved by using a geographically-distributed electronically-steered array (DESA) antenna system.

In an aspect, a system for wireless communications includes a plurality of teleports and a remote processing node that is located in a location that is remote from the plurality of teleports. One or more of the plurality of teleports may be redundant teleports. Each teleport comprises an antenna element and a processor, and the antenna element is configured to receive a first analog signal from a transceiver, and the processor is configured to convert the first analog signal into a first digital signal of a plurality of first digital signals. The remote processing node includes a modem, a plurality of digital-to-analog converters, a combiner, a splitter, and a plurality of analog-to-digital converters. As part of the receiver processing, the remote processing node is configured to receive the plurality of first digital signals over each of a plurality of fiber optic cables, a digital-to-analog converter is configured to delay the first digital signal by a corresponding delay and convert a delayed first digital signal to a second analog signal of a plurality of second analog signals, and the combiner is configured to measure a phase shift in each of the plurality of second analog signals, feedback a corresponding phase shift to a corresponding digital-to-analog converter that determines the corresponding delay based on the corresponding phase shift, and coherently combine the plurality of second analog signals for processing by the modem. Herein, the remote processing node is configured to adaptively select or deselect the redundant teleports in response to one or more failure or weather events, and the plurality of first digital signals are received only from the adaptively selected teleports. Additionally, or alternatively, the remote processing node is further configured to adaptably select one or more of the plurality of second analog signals based on information from an external source. As part of the transmitter processing, the modem is configured to generate an information signal, the splitter is configured to split the information signal in a plurality of third analog signals, and each analog-to-digital converter is configured to convert a third analog signal to a third digital signal. The third digital signal is then transmitted to a corresponding teleport, which is configured to apply the corresponding delay to the third digital signal prior to transmission to the transceiver.

In another aspect, a system for wireless communications includes a plurality of teleports and a remote processing node, which is located in a location that is remote from the plurality of teleports. Each teleport comprises an antenna element and a processor, the processor being configured to convert a first digital signal of a plurality of first digital signals into a first analog signal of a plurality of first analog signals, wherein each of the plurality of first analog signals has a corresponding phase shift, and the antenna element being configured to transmit the first analog signal. The remote processing node is configured to determine a corresponding delay in a second digital signal of a plurality of second digital signals from the corresponding phase shift, the plurality of second digital signals corresponding to a plurality of second analog signals received by the plurality of teleports, the corresponding delay being determined based on coherently combining a plurality of third analog signals, and each of the plurality of third analog signals being generated by converting a corresponding second digital signal of the plurality of second digital signals.

In yet another aspect, a method of configuring a communication system includes converting, at each teleport of a plurality of teleports, one first digital signal of a plurality of first digital signals into a corresponding first analog signal of a plurality of first analog signals, each of the plurality of first analog signals having a corresponding phase shift, and transmitting, by each teleport, the corresponding first analog signal. In this method, a remote processing node, which is located in a location that is remote from the plurality of teleports, is configured to determine a corresponding delay in a second digital signal of a plurality of second digital signals from the corresponding phase shift, the plurality of second digital signals corresponds to a plurality of second analog signals received by the plurality of teleports, the corresponding delay is determined based on coherently combining a plurality of third analog signals, and each of the plurality of third analog signals is generated by converting a corresponding second digital signal of the plurality of second digital signals.

In yet another aspect, the above-described method is embodied in the form of processor-executable code and stored in a computer-readable program medium.

In yet another aspect, a device that is configured or operable to perform the above-described method is disclosed.

The above and other aspects and their implementations are described in greater detail in the drawings, the description, and the claims.

DETAILED DESCRIPTION

Figure 1:
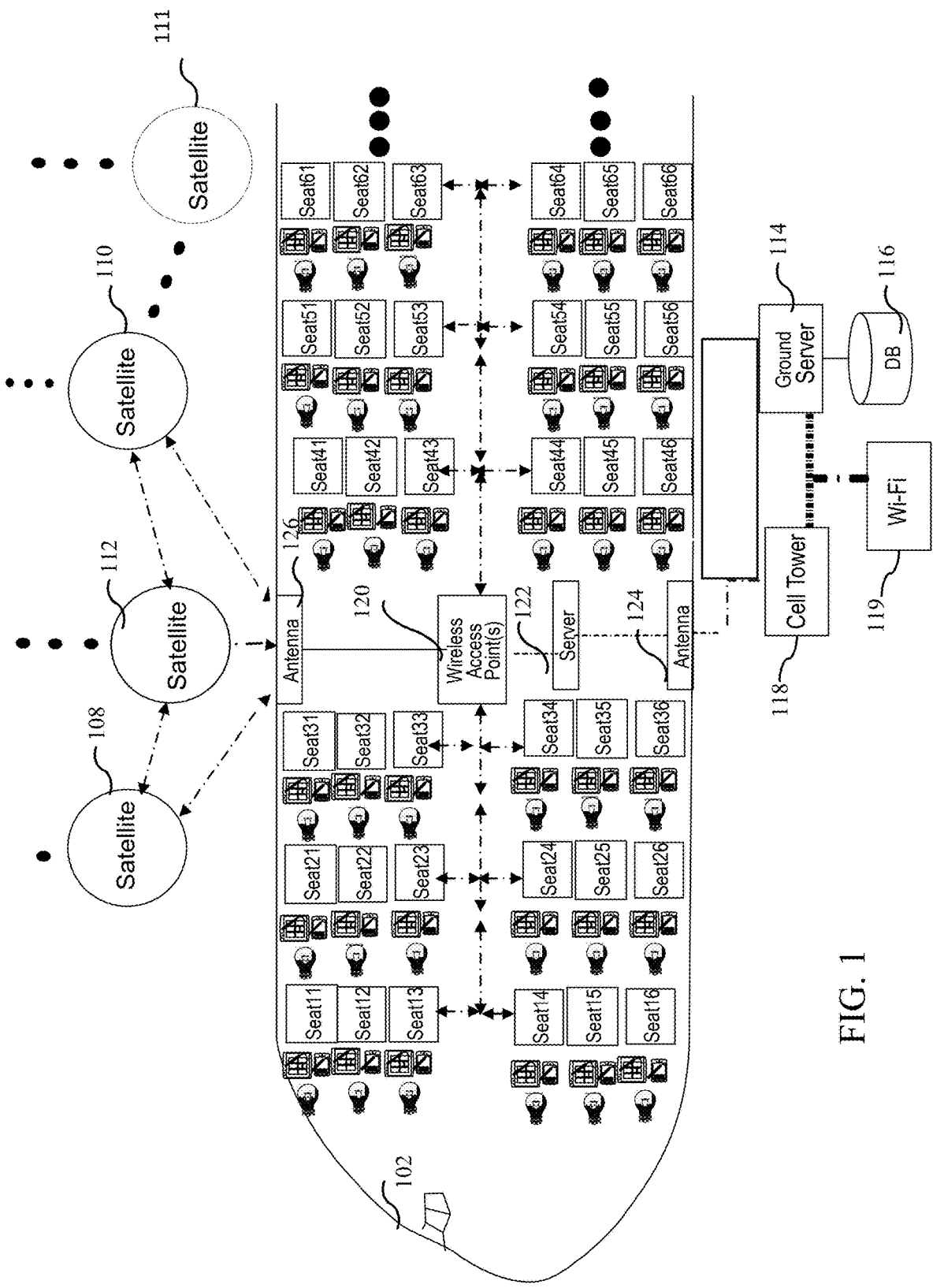
FIG. 1 shows an example of an in-flight entertainment (IFE) system installed in an airplane based on some implementations of the disclosed technology.

Satellites play a crucial role in improving lives in today's digital economy. Nearly every industry relies upon satellite technology in some way—from agriculture to banking to transportation. With respect to the latter industry, the in-flight connectivity (IFC) market has been going through major changes, which directly impact an end customer inflight experience, airliners offering and differentiation, service provider, and satellite network provider. Some of the changes are linked to the emergence of Low Earth Orbit (LEO) satellite networks. When compared to Geostationary Earth Satellite (GEO) and medium earth orbit (MEO) satellite, the LEO network offers higher transmission rates and lower latency, which may translate to superior user experience and more reliable connectivity that is closer to the experience at home. Because of operational requirements, the importance of delivering in-flight connectivity in a single orbit system (including LEO, MEO, or GEO satellite network(s)) and a multi-orbit system (including at least two of LEO, MEO, and GEO satellite networks) has dramatically increased.

Embodiments of the disclosed technology provide connectivity to commercial passengers by using a satellite communication (SATCOM) system that transports IP packets between passenger electronic devices (PEDs) and groundside hosts. To transport data from PEDs to groundside hosts, the on-board SATCOM terminal forwards the data to one or more satellites, which wirelessly forward the data to one or more groundside teleports. Finally, the one or more groundside teleports forward the data to the groundside host. Data from groundside hosts are forwarded to the PEDs in the opposite direction.

As demand for connectivity services increases, SATCOM service providers need to provision their networks to accommodate the larger volume of data to be transported between PEDs and groundside hosts. Also, as passengers become more reliant on connectivity, the network needs to be designed to be more resilient to component failures and inclement weather (e.g., fading due to rain). The need for increased data carrying capacity could be addressed by building teleports with large antennas, which provides a higher signal-to-noise ratio (SNR) that results in a higher data rate. However, the cost for antennas grows exponentially (rather than linearly) as function of its surface area.

In order to reduce the total antenna cost, the disclosed embodiments generalize the antenna design concepts commonly found in localized phased array antennas to geographically distributed phased array antennas. For example, instead of a large antenna dish with surface area N×A meter$^2$ (m$^2$), we use N distributed antennas, each having a surface area of A m$^2$. The aggregated surface area remains the same, but the construction cost of the distributed antenna system is lowered.

When the satellite is within the scan angle of the distributed antenna system, digital beam forming is used to steer the antenna beam. As is described herein, the distributed antenna system may be further configured to add resiliency to the network. For example, when the expected traffic load is such that an antenna with surface area N×A m$^2$ is required to provide the required channel capacity, a resilient network could be built with N+M distributed antennas, each with a surface area of A m$^2$. In this case, the wireless channel is able to cope with M teleport failure or rain fade events.

Conventional ground-based systems typically employ microwave signaling to transfer audio and video signals to a satellite. These systems use large antennas but low power levels, which make the signal transmissions susceptible to storms or inclement weather. The technical solutions described in this document can be embodied in implementations to improve the overall connectivity, and provide systems that are more efficient, less costly, and which are resilient to channel fading (due to rain and inclement weather), while having a reduced footprint when compared to existing systems.

Various implementations are discussed in detail with reference to the figures below. In the description, an airplane is described as an example of the passenger vehicle, but the implementations of the disclosed technology can be applicable to other passenger vehicles such as buses, trains, ships, and other types of commercial passenger vehicles.

FIG. 1 shows an example of an in-flight entertainment (IFE) system for passengers in a commercial passenger vehicle such as an airplane. The example diagram of the in-flight system as shown in FIG. 1 is provided to explain how wireless connections are supported in the airplane 102. The components shown as a single element in FIG. 1, e.g., the server 122, the database 116, the wireless access point 120, etc. can be configured in multiple elements. For example, the in-flight service system can include multiple wireless access points to facilitate or support providing of wireless coverages for the passengers.

The IFE system provides various entertainment and connectivity services to passengers on board. Referring to FIG. 1, the IFE system includes a server 122, antenna 126, and antenna 124. The passengers carry their own devices, which include the PEDs (illustrated by the light bulb icon in FIG. 1) and other wireless electronic devices. The PEDs may refer to any electronic computing device that includes one or more processors or circuitries for implementing the functions related to data storage, video and audio streaming, wired communications, wireless communications, etc. The examples of the PEDs include cellular phones, smart phones, tablet computers, laptop computers, and other portable computing devices. In the implementations of the disclosed technology, the PEDs may have the capability to execute application software programs ("apps") to perform various functions.

In FIG. 1, the airplane 102 is depicted to include multiple passenger seats, Seat 11 to Seat 66. The example diagram as shown in FIG. 1 shows the economy seats only but different types of passenger seats (e.g., premium economy class, premium class, first class, etc.) can be further provided in the airplane 102. The media playback devices (illustrated by screen icon) are provided at each passenger seat and configured with capabilities for video and audio streaming, Internet communications, and other capabilities. In some implementations, the media playback devices are provided at each passenger seat, such as located at each of the seatbacks of the passenger seats, and/or on cabin walls and/or deployable from an armrest for seats located at a bulkhead (i.e., in the first row of a section). The media playback devices have displays providing interfaces to each passenger through which each passenger enters their selections on the entertainment option, for example, a selection to watch a video program, a selection of a particular video program to watch, etc. The media playback devices can also allow each passenger to enter the selections of wireless network option, emergency requests, etc. To facilitate communications with the passengers, various graphic user interface (GUI) functions can be suggested and displayed on the media playback devices.

In some implementations, the media playback devices, the server 122, and the PEDs may be in communication through wired connections or wireless connections. In some implementations, the communication among the server 122, the media playback devices, and the PEDs are achieved through the antenna 124 to and from the ground-based cell towers 118 by, for example, a provision of network plugs at the seat for plugging PEDs to a wired onboard local area network. In some other implementations, the communications among the server 122, the media playback devices, and the PEDs are achieved through the antenna 126 to and from satellites 108, 109, 110, 111 in an orbit (e.g., via a cellular network utilizing one or more onboard base station(s), Wi-Fi utilizing the wireless access point 120, and/or Bluetooth). For example, the wireless network utilizing the wireless module of the media playback devices, and/or the wireless access point 120 can be formed among the server 122, the media playback devices, and the PEDs and allow the communication therebetween.

The server 122 is communicably coupled with media playback devices and the PEDs and configured to perform various operations including processing requests/inputs from passengers and providing data to passengers. In some implementations, the server 122 may communicate with other systems, for example, the ground server 114, the database 116, and the gate terminal (not shown), which are located outside of the airplane 102. The server 122 can communicate with the systems on ground such as the ground server 114, the database 116, and the gate terminal via the antenna 124 for receiving and transmitting information from/to the other systems. As further discussed later in this patent document, in the implementations of the disclosed technology, the ground server 114 operates to control the video streaming services by generating video program package containing one or more video programs and transmitting the generated video program package to satellites such that the satellites transmit the video program package to the aircrafts through satellite beams.

In some examples, cell towers 118 communicate or interface with the antenna 124 of the airplane 102, such that ground systems such as the ground server 114, the database 116, and the gate terminal can transmit and receive data with the server 122 and other in-vehicle systems. In some implementations, Wi-Fi element 119 provides a wireless local area network (WLAN) to allow the server 122 to communicate with the ground systems. Thus, the cell tower 118 and the Wi-Fi element 119 may act as communication nodes between the antenna 124 of the airplane 102 and the ground systems such as the ground server 114, the databases 116, and the ground terminal. In some implementations, the server 122 implements a router for the wireless onboard networks and various functionality disclosed herein to provide video streaming services for passengers in the airplane 102. The gate terminal can be implemented as a computing device and operate to maximize efficiency and safety of passenger transfers and aircraft servicing. The ground server 114 and the gate terminal may be in communication with the database 116 and provide information from the database 116 to the server 122 and store information received from the server 122 in the database 116. Although FIG. 1 shows that the database 116 is provided separately from the ground server 114, the database 116 can be provided as a part of the ground server 114. The gate terminal may be in communication with the ground server 114 and the database 116.

Although not shown in FIG. 1, the IFE system may further include a database which stores passenger information, for example, profiles of the passengers (name, age, etc.), preferred entertainment options (movies, music, shows, etc.), preferred entertainment content (e.g., genres of movies), etc. The passenger information can be obtained in various ways and stored in the database of the IFE system. In some implementations, the passenger information is obtained prior to the passengers coming on board (e.g., when purchasing the tickets or checking in for the flights), or at other times. In some implementations, the passenger information can be obtained and shared by an association of several airplane companies and retrieved from the database 116. In some implementations, the passenger information can be updated during the trip.

Figure 2B:
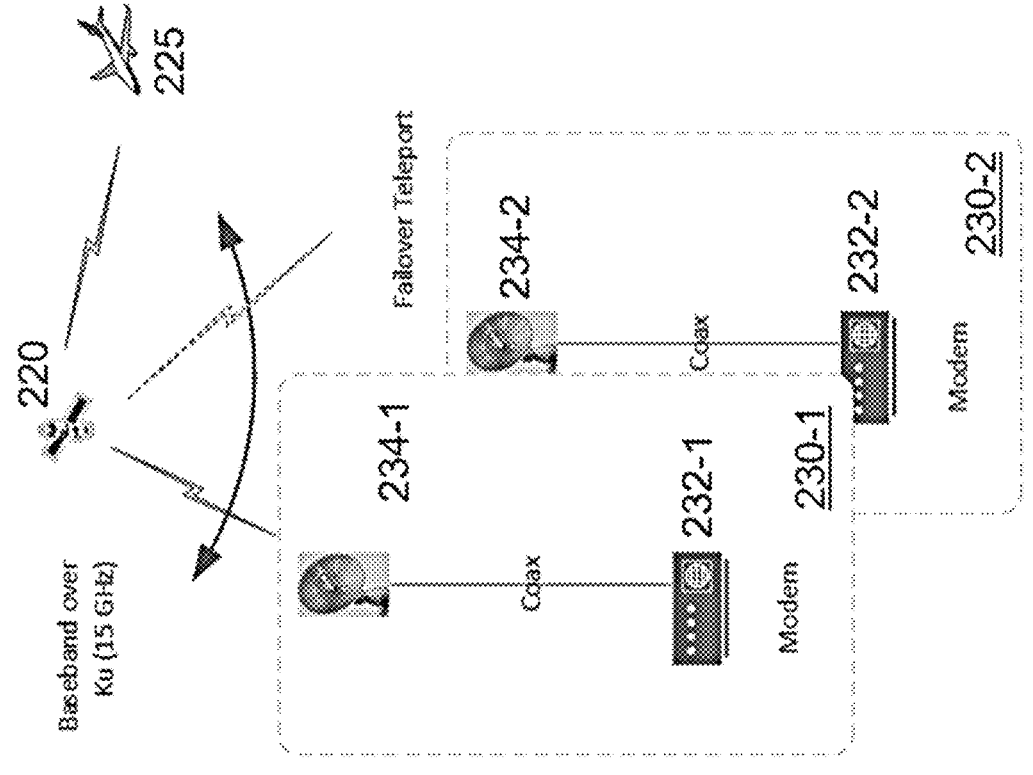
FIGS. 2A and 2B show examples of conventional systems for satellite connectivity.
Figure 2A:
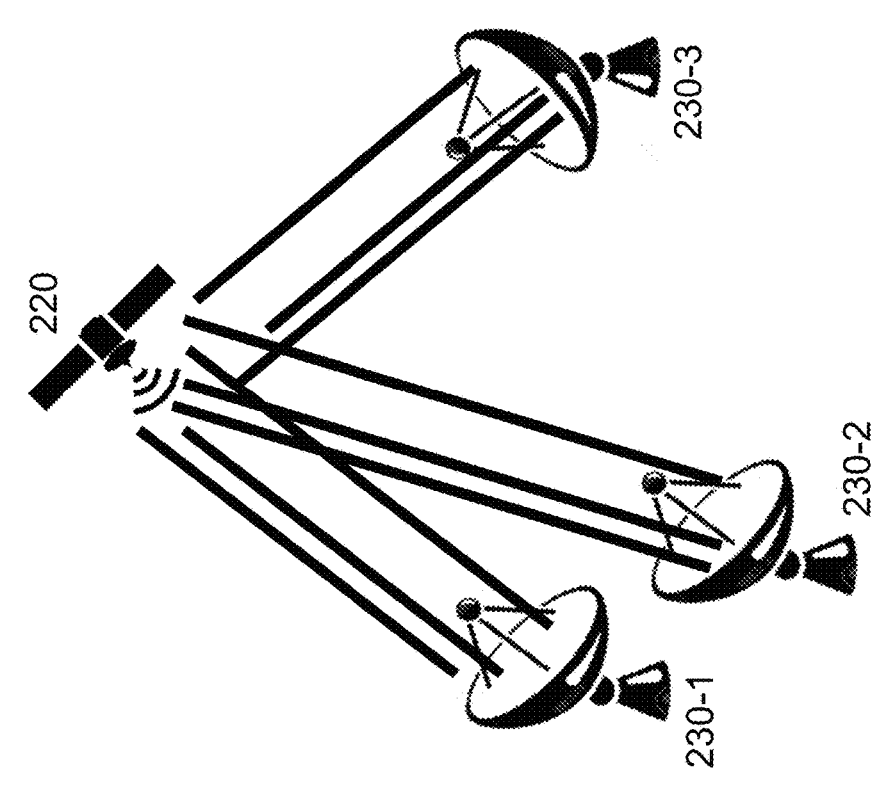

FIGS. 2A and 2B show examples of conventional systems for satellite connectivity. As shown in FIG. 2A, a conventional communication system includes ground-based terminals 230-1, 230-2 and 230-3. All three ground-based terminals are used to simultaneously establish an uplink and a downlink to the satellite. In an example, the satellite may be in communication with an airplane (not shown in FIG. 2A) to provide various communication services, e.g., content for the IFE. Although only three terminals are shown in FIG. 2A, systems that are configured to support specific throughput requirements may implement more or less terminals. In this document, a ground-based terminal is referred to as a "teleport," which is a center providing interconnections between different forms of telecommunications, especially one which links satellites to ground-based communications.

In some examples, the terminals in the conventional system for satellite connectivity shown in FIG. 2A can be configured to operate using the Ka-band (i.e., frequencies in the range 26.5-40 gigahertz (GHz)) and the Ku-band (e.g., frequencies in the range 12-18 GHz). In an example, 5 teleports are used to operate in a 20 GHz communication bandwidth, with 2 GHz uplink bandwidth between 17-21 GHz, and 2 GHz downlink bandwidth between 27-31 GHz. In another example, 20 teleports are used with each teleport operating with a 0.5 GHz bandwidth between 12-18 GHz for both the uplink and downlink. In these examples, each of the Ka-band ground-based antennas typically require an antenna dish with a diameter ranging from 13 m to 18 m. Larger diameter antennas increase system costs, and these antennas require custom-made, expensive, stand-alone, and heavy-duty mounts.

In other examples, the terminals in the conventional system for satellite connectivity shown in FIG. 2A can be configured to operate using the Q-band (i.e., frequencies in the range 33-50 GHz) and V-band (i.e., frequencies in the range 40-75 GHz). In an example, 3 teleports are required, with each teleport operating with a 4 GHz bandwidth. Even in these examples, Q-band and V-band teleports typically require 7 m diameter antenna dishes, as well as custom-made, expensive, stand-alone, and heavy-duty mounts.

These conventional systems may be reconfigured to use dish antennas with smaller diameters, which reduces the size and weight of the ground-based antennas, but there is a corresponding increase in signal fading whenever there are obstacles and/or inclement weather in a line-of-sight communication path between the teleport and the satellite. For example, signal fades and satellite signal attenuation due to rain, snow, clouds, or ice may result in a reduction of signal strength between 5% and 20%. Thus, conventional systems are incentivized to use larger diameter antenna dishes to compensate for signal fading, cross-talk, channel distortions, etc. Furthermore, uplink ground-based terminals operating in high-frequency communication bands typically transmit at low power levels, which results in a loss of communication in the presence of storms or inclement weather.

FIG. 2B shows an example of a conventional communication system configured to address a loss of communication that may arise for a variety of reasons. As shown therein, if the wireless channel between the satellite 220 and teleport 230-1 were to degrade sufficiently enough so as not to be able to support the required throughput, the system switches over to using a failover teleport 230-2 in order to maintain the communication link between the satellite 220 and an airplane 225. Teleport 230-2 is typically located at some distance from teleport 230-1, which results in the failover wireless channel being independent (in terms of channel fading) of the wireless channel between teleport 230-1 and the satellite 220. As shown in FIG. 2B, teleport 230-1 includes a modem 232-1 and dish antenna 234-1, and teleport 230-2 includes modem 232-2 and dish antenna 234-2. Configuring the failover teleport 230-2 be identical to the primary teleport 230-1 is necessary because the same functionality has to be supported, i.e., the failover teleport 230-2 is paired with the primary teleport 230-1.

In the conventional system shown in FIG. 2B, the air-to-ground link is configured to use a groundside electronically-steered array (ESA) antenna with M array elements that collects radio frequency (RF) signals (e.g., at 15 GHz) at each array element, coherently combines the M signals, downshifts the combined signal to an intermediate frequency (IF), and forwards the IF signal to the receiver for demodulation. At the receiver, the signal-to-noise-and-interference ratio (SINR) for the ESA is given as:

$$SINR_{ESA} = M \times A \times \frac{PFD}{(I+N)}.$$

Herein, A is the area of each antenna element, PFD is the power flux density (in W/m$^2$), and I and N are the interference and noise, respectively. For the ground-to-air link, the ESA receives the IF signal from the modem, upconverts the signal to RF, splits the signal power into M identical signals, thereby associating each signal with a corresponding array element, shifting the individual signals such that they interfere constructively at the target receiver, and amplify and radiate the RF signals from the M array elements. The effective output power is denoted EIRP$_{ESA}$. In these conventional systems, each teleport hosts an ESA with surface area MA, and only one teleport is active at any point in time.

However, if the communication system (as described in the context of FIG. 2A) is using antenna dishes with diameters ranging from 13 m to 18 m, deploying a failover teleport can be expensive. Furthermore, providing this level of redundancy (which is referred to as (1+1) geo-redundancy) as the number of teleports increase (e.g., deployed as a cluster of teleports) can be prohibitively expensive because each primary teleport requires a paired failover teleport (e.g., a single-fault tolerant system requires two ESAs, each of size MA). Thus, if 10 teleports were required to support the required system throughput, then adding the required level of redundancy would need the deployment of 20 teleports. This is due to the fact that each of the teleports (in either the primary cluster, the failover cluster, or across the two clusters) is transmitting independently of the other teleports, and the signals are combining incoherently at the satellite.

The described embodiments overcome the above-discussed drawbacks by providing a distributed phased-array uplink system that can be deployed using teleports that are spaced apart and have dish antennas with diameters ranging from 2 m to 4 m. In particular, the geographically-distributed teleports are configured to transmit uplink signals to the satellite at a reduced power level, but are still able to close the link due to the signals coherently combining at the satellite. Coherent combining on the uplink channel is achieved by time synchronization at the distributed terminals. Given the location of fixed terminals and the target satellite, each terminal uses an independently calculated signal propagation time to determine the appropriate phase shift (or equivalently, the appropriate delay) that should be applied to its uplink signal such that the signals are coherently combined at the satellite.

Embodiments of the geographically-distributed electronically-steered array (DESA) antenna system also deploy M array elements, but instead of being collocated at a single teleport as in the ESA antenna system, they are arbitrarily distributed within the footprint of the satellite. In the DESA antenna system, the air-to-ground link includes the airside terminal modulating digital data into analog symbols, upshifting the analog symbols to RF, and transmitting them serially to the satellite uplink transponder, which forward the signal to the downlink transponder. The satellite downlink transponder relays the RF signal in a satellite-to-ground beam, which is received by each of the M DESA antennas. Note that the signals received at each array element may be time-shifted due to the differences in distance between the satellite and each of the array elements. Upon reception of the RF signal, each DESA element downshifts the received RF signal to IF (e.g., from 15 GHz to 1.5 GHz), samples the IF signal for in-phase and quadrature (I/Q) components at the highest signal frequency (e.g., for an IF carrier of 1.5 GHz with a 1 GHz bandwidth, sampling is at 2 GHz), quantizes the I/Q samples (e.g., at 8 bits/sample), and forwards the quantized samples serially via a high-speed data link to a centralized Rake receiver, which may be located an arbitrary distance from the DESA antenna system. In an example, the receiver implements maximum likelihood decoding to align the plurality of I/Q streams from the DESA elements. After coherent combining, the resulting SINR for the DESA antenna system is $$SINR_{ESA} = M \times A \times \frac{PFD}{(I+N+\varepsilon)}.$$

Here, $\varepsilon$ is the increased interference due to the distributed nature of the DESA antenna system. In some embodiments, the parameters M, A, PFD, I and N are the same for the ESA and DESA antenna systems.

For the ground-to-air link of the DESA antenna system, each of the DESA elements are time synchronized. For example, in the case of a Ku signal (i.e., f=15 GHz, 1=0.2 m), the time synchronization at the DESA elements is within 10-11 seconds, which results in an uncertainty of 3×10−3 meters. In an example, this level of time synchronization is achieved using a combination of hardware and software. All teleports in the same satellite footprint receive a time reference from the same GPS source. When a real-time process is implemented to synchronize teleport's system time with received GPS time, iterative software algorithms are used to achieve a high level of time synchronization across teleports.

Each DESA calculates the distance between itself and the satellite, then sends the RF signal to the satellite. The aforementioned synchronization enables the RF signals to arrive at the satellite synchronously (or rather, within 10-11 second accuracy). The satellite then forwards the combined signal to the airside terminal, which downshifts the received RF signal to an IF signal, and then forwards it to a receiver.

Figure 3:
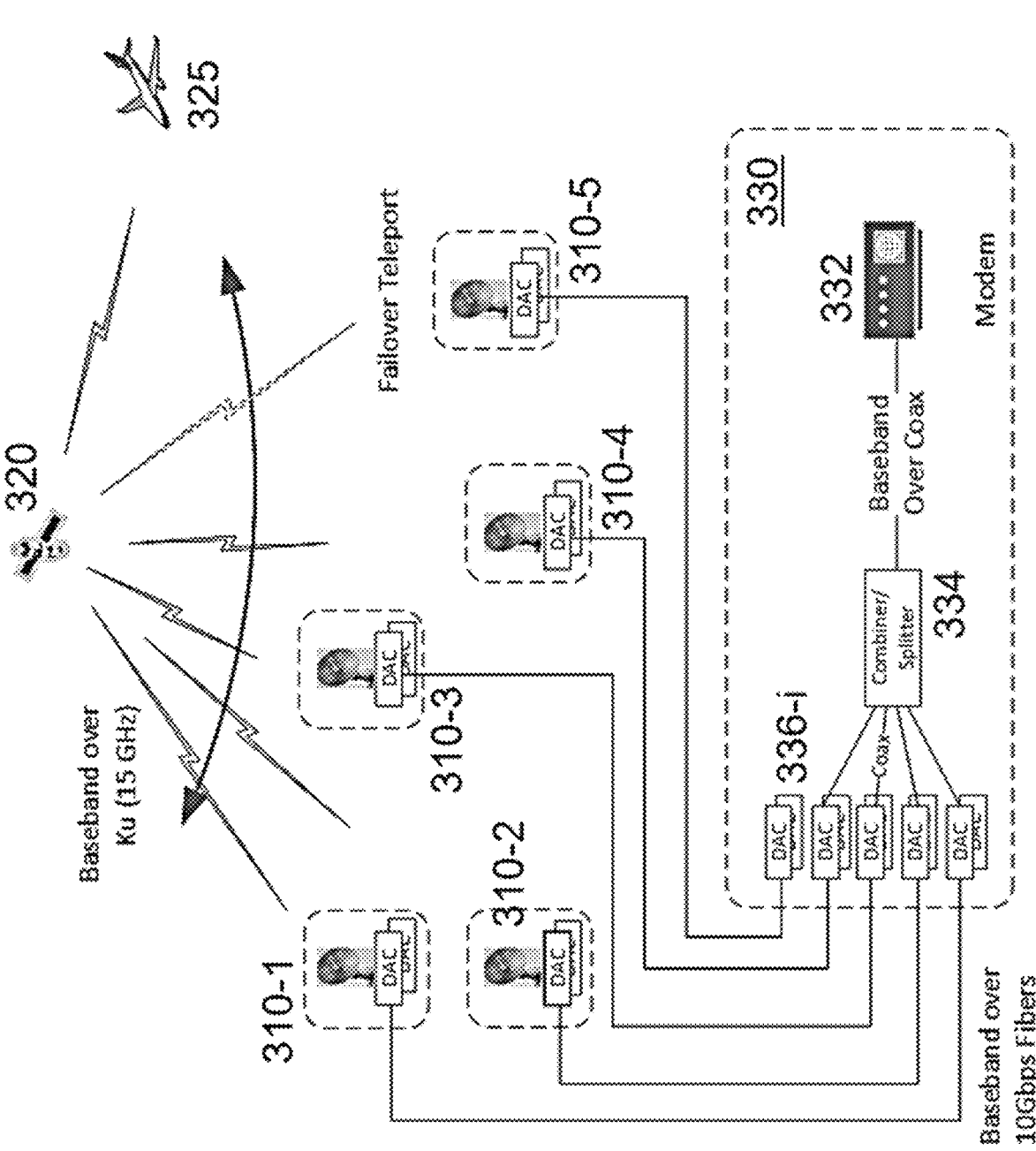
FIG. 3 shows an example of a system that employs a DESA antenna system for downlink satellite communication based on some implementations of the disclosed technology.

FIG. 3 shows an example of a system that employs a DESA antenna system for downlink (air-to-ground) satellite communication based on some implementations of the disclosed technology. As shown therein, multiple teleports (310-1, 310-2, 310-3 and 310-4) are in communication with a satellite 320, e.g., over the Ku-band in a 15 GHz bandwidth. The multiple teleports are spaced apart over a geographic area such that there are independent fading channels between each of the teleports and the satellite. In this example, the satellite is in communication with an airplane 325, and can provide various passenger services including entertainment and media content.

Although the DESA antenna system shown in FIG. 3 is susceptible to storms and inclement weather, which may result in a teleport (e.g., 310-2) being unable to reliably communicate with the satellite 320, the system is configured to provide redundancy, for example, with only a single additional teleport, e.g., 310-5. Coherently combining signals from the teleports advantageously enables any failed teleport to be replaced by any other teleport, i.e., there is no necessity to pair each teleport as in conventional systems (e.g., as described in the context of FIG. 2B). This is referred to as (N+1) geo-redundancy and significantly reduces deployment costs, which are further reduced by using dish antennas with diameters that range from 2 m to 3.8 m.

It is noted that the cost of antenna dishes does not scale linearly with their diameter. That is, a dish with a diameter of 10 m is more than twice as expensive as two dishes, each of which has a diameter of 5 m. This is expected because the surface area of a dish is $\pi r^2$, where r is the radius of the dish. Thus, using multiple smaller antenna dishes s is far more cost effective than using a fewer number of much larger antenna dishes.

Continuing with FIG. 3, each of the multiple teleports (310-1, . . . 310-4) and the failover teleport 310-5 are communicatively coupled to a remote processing node 330 using fiber optic cables. In an example, the fiber optic cable that connects teleport 310-1 to remote processing node 330 supports a throughput of up to 10 Gbps. Each teleport (e.g., 310-1) receives an analog signal from the satellite 320 and converts the analog signal into the digital domain (either at baseband or at an intermediate frequency (IF)), and that digital signal is transmitted to the remote processing node 330 via the corresponding fiber optic cable.

Each of the digital signals from the multiple teleports are received at the remote processing node 330, and is processed using a corresponding digital-to-analog converter (DAC) 336-i (i=1, . . . , 5), which converts the incoming digital signal to an analog signal that is sent to a combiner/splitter 334 via a coaxial cable. Each analog signal that is input to the combiner 334 has a distinct phase shift due to the corresponding teleport communicating with the satellite 320 from a different location. The combiner 334 is configured to measure the phase shift and feed back the value of the phase shift to the DAC 336-i, which converts the phase shift into a delay value, and delays the corresponding incoming digital signal by that delay value. This ensures that the signals from the multiple teleports coherently combine when combined by the combiner 334.

In some embodiments, the range of values for the phase shifts and/or delays is based on a size of the geographic area that is spanned by the multiple teleports. For example, in a square-shaped area of 50 km², the maximum differential latency is 0.75 microseconds.

In some embodiments, the varying latency between the remote processing node 330 and the teleports 310-i is compensated by the receiver. The remote processor and the teleports are time synchronized (with the same time synchronous requirement among teleports). The propagation latency is the known from the absolute transmission timestamp that accompanies data packets from the source (which could be either the remote processor or the teleport) versus the absolute time at the receiver.

The signals are combined by combiner 334 and then transmitted to a modem 332, which is communicatively coupled to the combiner 334 via a coaxial cable. The combined signal can be demodulated and decoded by the modem 332 to reconstruct the signal transmitted by the satellite 320 to the multiple teleports (310-1, . . . , 310-5).

Transmitting a digital information signal from the remote processing node 330 to the satellite 320 includes converting the digital information signal to an analog signal, and then splitting the analog signal using splitter 334. Each of the split analog signals are processed by a corresponding analog-to-digital converter (ADC), not shown in FIG. 3, which converts the signal to the digital domain. The digital signals are transmitted to their respective teleports using fiber optic cables.

Figure 4:
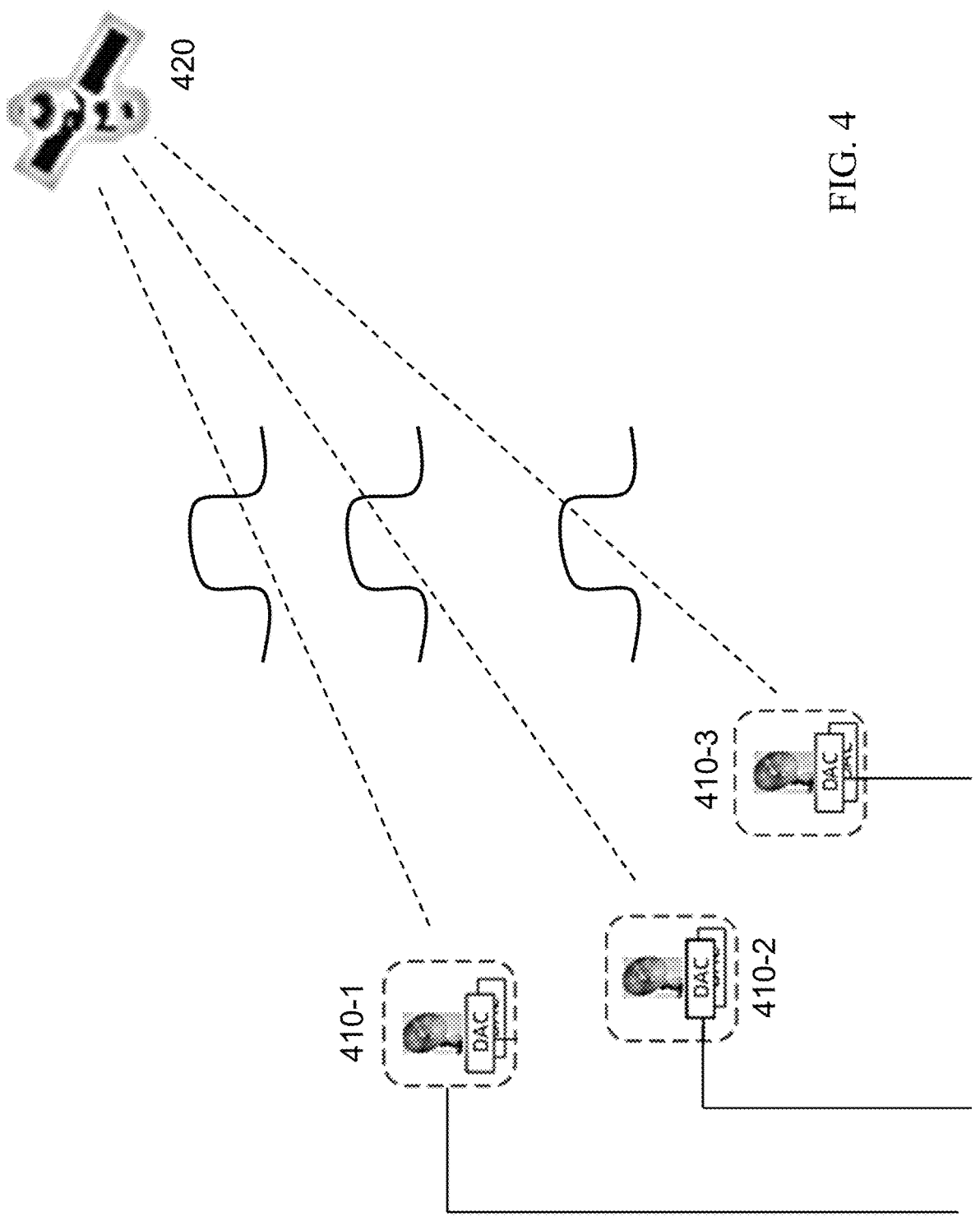
FIG. 4 shows an example of a system for uplink satellite communication based on some implementations of the disclosed technology.

FIG. 4 shows an example of a system for uplink (ground-to-air) satellite communication based on some implementations of the disclosed technology. Each signal is converted to an analog signal (not shown in FIG. 4) to which a delay is applied prior to transmission from the teleport (410-1, 410-2, 410-3) using a dish antenna with a 2 m to 4 m diameter. The delay is calculated independently at each teleport, for coherent combining at the satellite, using the absolute data transmission timestamp, the received timestamp, and the propagation latency between teleport and satellite. Each of the delayed signals are transmitted at a reduced power (compared to conventional systems), and coherently combine (as indicated by the aligned waveform snippets) when received by the satellite 420.

Figure 5:
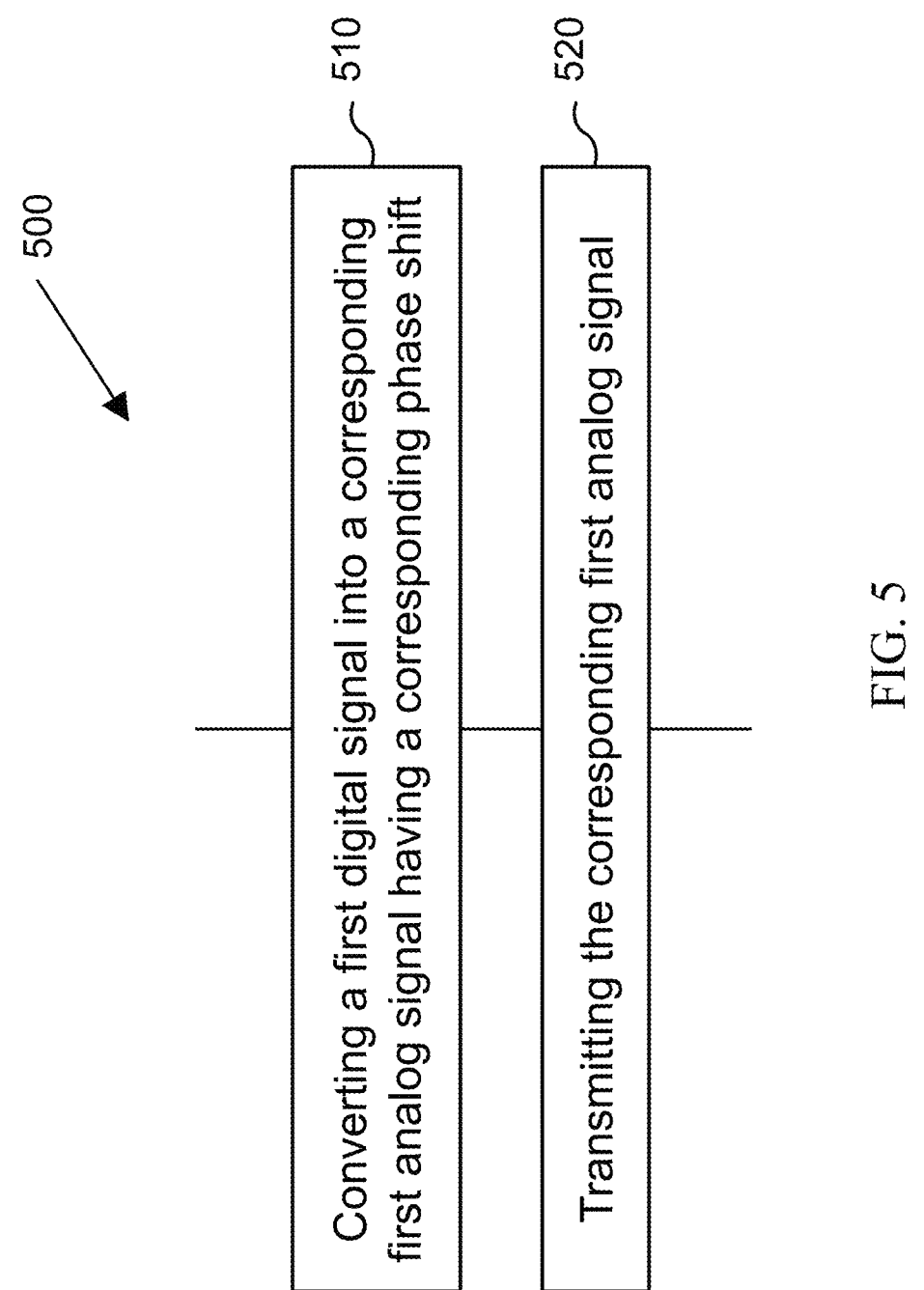
FIG. 5 shows a flowchart for an example method for configuring a communication system based on some implementations of the disclosed technology.

FIG. 5 shows an example method of configuring a telecommunications system based on some implementations of the disclosed technology. In some implementations, the method 500 may be performed by the each of the teleports shown in FIGS. 3 and 4.

At operation 510, the teleport converts a first digital signal into a corresponding first analog signal having a corresponding phase shift.

At operation 520, the teleport transmits the corresponding first analog signal.

In this method, a remote processing node, at a location that is remote from each teleport, is configured to determine a corresponding delay in a second digital signal of multiple second digital signals from the corresponding phase shift, the multiple second digital signals corresponding to multiple second analog signals received by each teleport, the corresponding delay being determined based on coherently combining multiple third analog signals, and each of the multiple third analog signals being generated by converting a corresponding second digital signal of the multiple second digital signals.

The disclosed embodiments provide a system for wireless communication that, in the context of FIG. 3, includes a plurality of teleports (e.g., 310-1, 310-2, . . . ), wherein each teleport comprises an antenna element and a processor, wherein the processor is configured (e.g., during the transmission or uplink operation) to convert a first digital signal (e.g., the digital signal being received, via the fiber optic cable, by a teleport 310-1) of a plurality of first digital signals into a first analog signal (e.g., the analog signal that will be transmitted by the teleport 310-1) of a plurality of first analog signals, wherein each of the plurality of first analog signals has a corresponding phase shift, and wherein the antenna element is configured to transmit the first analog signal (e.g., the teleport 310-1 transmits the analog signal to the satellite 320); and a remote processing node (e.g., 330), which is located in a location that is remote from the plurality of teleports, configured (e.g., during the reception or downlink operation that precedes the uplink operation) to determine a corresponding delay in a second digital signal (e.g., digital signals sent from the teleports 310-i to the remote processing node 330 via the fiber optic cable) of a plurality of second digital signals from the corresponding phase shift, wherein the plurality of second digital signals corresponds to a plurality of second analog signals (e.g., analog signals received at the teleports 310-i from the satellite 320) received by the plurality of teleports, wherein the corresponding delay is determined based on coherently combining a plurality of third analog signals (e.g., the analog signals generated by the DACs 336-i in the remote processing node 330), and wherein each of the plurality of third analog signals is generated by converting a corresponding second digital signal of the plurality of second digital signals (e.g., the digital signals that are input to the DACs 336-i).

In the above-described system, the plurality of teleports (e.g., 310-1, 310-2, . . . ) includes a redundant teleport. Herein, and as described earlier, a redundant teleport is a teleport that need not be activated or used in order to meet the required system throughput for a certain time period or for a particular application.

Additionally, or alternatively, the remote processing node (e.g., 330) is configured to adaptively select or deselect at least one of the plurality of teleports (e.g., 310-1, 310-2, . . . ) in response to one or more failure or weather events. For example, if there is a component failure at a particular teleport, that teleport will be deactivated, and a redundant teleport will be activated to serve in its stead. Similarly, if communications to and from a particular teleport is being significantly degraded due to inclement weather events, that teleport will be deactivated, and a redundant teleport in a location that is not experiencing inclement weather will be activated to serve in its stead. The selection or deselection of a teleport, by the remote processing node, can be implemented either at the teleport (e.g., the deactivated teleport does not send its received RF signal to the remote processing node) or at the remote processing node itself (e.g., the RF signal received from a teleport that has been designated deactivated will not be processed further).

Additionally, or alternatively, the remote processing node (e.g., 330) is configured to adaptably select one or more of the plurality of third analog signals based on information from an external source. In an example, the external source may be an external frequency source that transmits Doppler shift or pilot (or training) signals that indicate the reliability (or unreliability) of one or more of the plurality of third analog signals received by the remote processing node. The selection of only reliable third analog signals advantageously improves delay estimation based on the phase shift values that are fed back to the DACs (e.g., DACs 336-i in the remote processing node 330), which consequently improves the coherently combining at the satellite. It is noted that the selection of the third analog signals can be implemented by selecting the third analog signals themselves, e.g., at the output of the DACs, or by selecting the phase values that fed back to the DACs by the combiner.

The disclosed embodiments further provide, inter alia, the following advantages:

a lower antenna cost due to deploying dish antennas with smaller diameters. This is due to the cost to construct antennas being super-linear as a function of surface area. That is, the cost to construct an antenna of surface area MA is greater than M times the cost to construct an antenna of surface area A;

resiliency to fading (e.g., from storms and inclement weather) due to the teleports being geographically distributed over areas that can range from 1 km$^2$ to 100 km$^2$;

reduced installation costs due to being able to use a non-penetrating roof mount (NPRM), which is compatible with dish antennas with diameters less than 3.8 m;

(N+1) geo-redundancy. For example, in a system where a minimum of M DESA elements are required to support the expected traffic demand, if M+N DESA elements are deployed, the system can tolerate N faults (e.g., due to weather, hardware failures, software failures, etc.). In contrast, a traditional system requires two antennas of size MA to become single-fault tolerant; and scalability bandwidth by increasing the baseband bandwidth without using larger diameter dish antennas and corresponding high-power amplifiers; and scalable spectral efficiency by constructing and activating additional DESA elements. The spectral efficiency (maximum number of information bits transferred per hertz) depends on Es/N0, which is proportional to SINR, which is proportional to total antenna surface area. Thus, when an operator wants to increase the system spectral efficiency, the additional DESA elements increase the Es/N0, and enable the system to use a higher-order modulation and coding scheme to transfer more bits per hertz.

Figure 6:
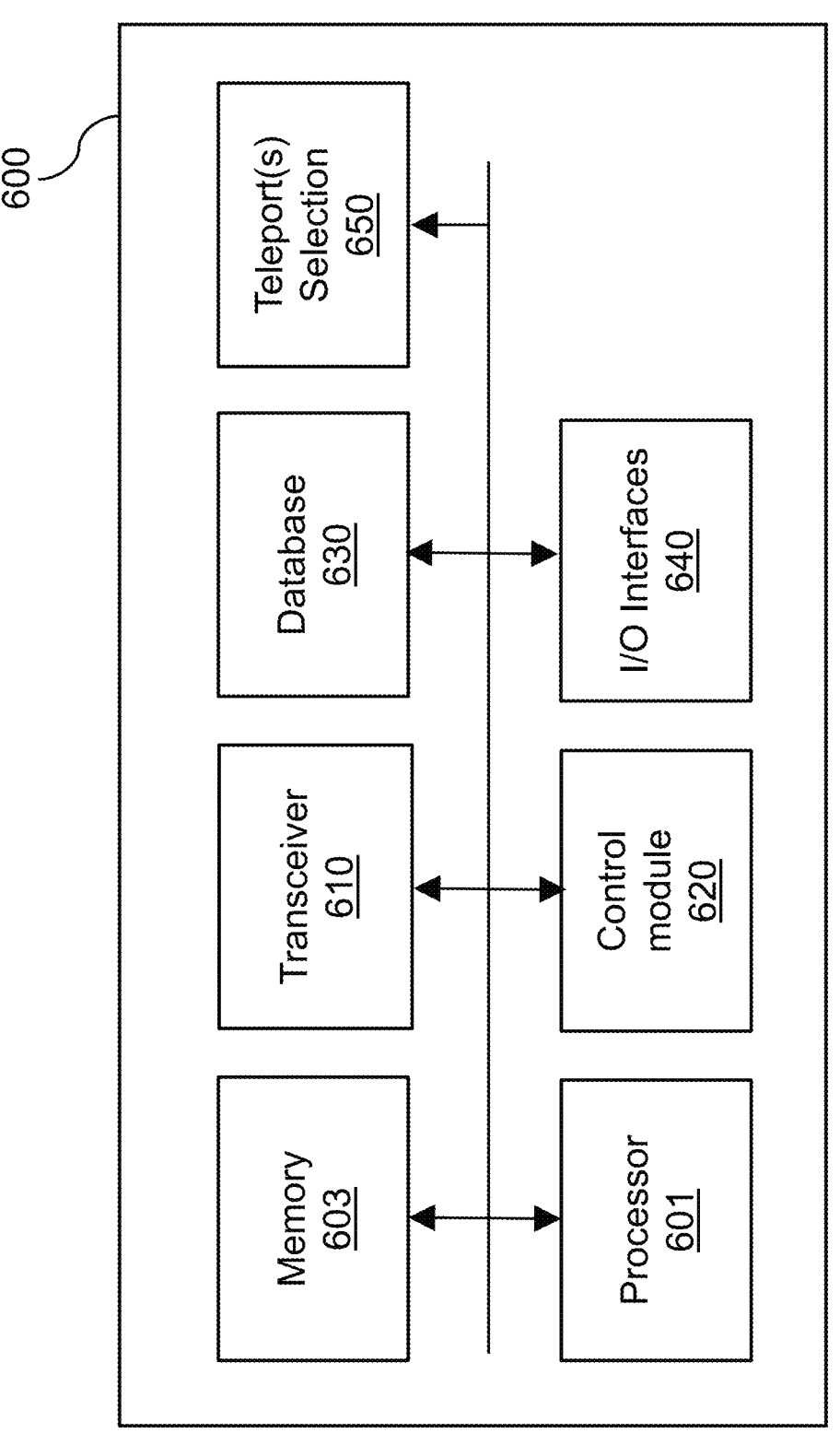
FIG. 6 shows an example block diagram of a computing device based on some implementations of the disclosed technology.

FIG. 6 shows an example block diagram of a computing device (e.g., an onboard server, a media playback device, a PED, or a teleport) based on some implementations of the disclosed technology. The computing device 600 includes at least one processor 601, a memory 603, a transceiver 610, a control module 620, a database 630, an input/output (I/O) interface 640, and a teleport selection module 650. In other embodiments, additional, fewer, and/or different elements may be used to configure the computing device 600. The memory 603 may store instructions and applications to be executed by the processor 601. The memory 603 is an electronic holding place or storage for information or instructions so that the information or instructions can be accessed by the processor 601. The memory 603 can include, but is not limited to, any type of random-access memory (RAM), any type of read only memory (ROM), any type of flash memory, such as magnetic storage devices (e.g., hard disk, floppy disk, magnetic strips, etc.), optical disks (e.g., compact disc (CD), digital versatile discs (DVD), etc.), smart cards, flash memory devices, etc. The instructions upon execution by the processor 601 configure the computing device 600 to perform the operations (e.g., the operations as shown in FIG. 4). The instructions executed by the processor 601 may be carried out by a special purpose computer, logic circuits, or hardware circuits. The processor 601 may be implemented in hardware, firmware, software, or any combination thereof. The term "execution" is, for example, the process of running an application or the carrying out of the operation called for by an instruction. The instructions may be written using one or more programming language, scripting language, assembly language, etc. By executing the instruction, the processor 601 can perform the operations called for by that instruction.

The processor 601 operably couples with the memory 603, the transceiver 610, the control module 620, the database 630, and the I/O interface 640, to receive, send, and process information and to control the operations of the computing device 600. The processor 601 may retrieve a set of instructions from a permanent memory device, such as a ROM device, and copy the instructions in an executable form to a temporary memory device that is generally some form of RAM. In some implementations, the computing device 600 can include a plurality of processors that use the same or a different processing technology. The transceiver 610 may include a transmitter and a receiver. In some embodiments, the computing device 600 comprises a transmitter and a receiver that are separate from another but functionally form a transceiver. The transceiver 610 transmits or sends information or data to another device (e.g., another server, a PED, etc.) and receives information or data transmitted or sent by another device (e.g., another server, a PED, etc.).

The control module 620 of the computing device 600 is configured to perform operations to assist the computing device 600. In some implementations, the control module 620 can be configured as a part of the processor 601. In an example, the control module 620 can operate in conjunction with the teleport selection module 650 to determine whether any teleports have failed, and to bring up a failover teleport. In another example, the control module 620 is configured to determine the delay based on the phase shift signal that is fed back from the combiner. In some implementations, the control module 620 can operate machine learning/artificial intelligence (AI) applications that perform various types of data analysis to select teleports, determine optimal delay values to ensure coherent combining is achieved, and similar operations. Using algorithms that iteratively learn from data, machine learning applications can enable computers to learn without being explicitly programmed. The machine learning/AI applications may be configured to use data learning algorithms to build models to interpret various data received from the various devices or components to detect, classify, and/or predict future outcomes. Such data learning algorithms may be associated with rule learning, artificial neural networks, inductive logic programming, and/or clustering. In some implementations, the control module 620 may assist the computing device 600 to perceive their environment and take actions that maximize the effectiveness of the operations performed by the computing device 600.

The I/O interfaces 640 enable data to be provided to the computing device 600 as input and enable the computing device 600 to provide data as output. In some embodiments, the I/O interfaces 640 may enable user input to be obtained and received by the computing device 600 (e.g., via a touch-screen display, buttons, switches) and may enable the computing device 600 to display information. In some embodiments, devices, including touch screen displays, buttons, controllers, audio speakers, or others, are connected to the computing device 600 via I/O interfaces 640.

Various techniques preferably incorporated within some embodiments may be described using the following solution-based format.

1. A system for wireless communication, comprising: a plurality of teleports, wherein each teleport comprises an antenna element and a processor, wherein at least one of the plurality of teleports is a redundant teleport, and wherein the antenna element is configured to receive a first analog signal from a transceiver, and the processor is configured to convert the first analog signal into a first digital signal of a plurality of first digital signals; and a remote processing node that is located in a location that is remote from the plurality of teleports, comprising: a modem, a plurality of digital-to-analog converters, and a combiner, wherein the remote processing node is configured to (a) adaptively select or deselect at least one of the plurality of teleports in response to one or more failure or weather events, and (b) receive the plurality of first digital signals from adaptively selected teleports over each of a plurality of fiber optic cables, wherein a digital-to-analog converter is configured to delay the first digital signal by a corresponding delay and convert a delayed first digital signal to a second analog signal of a plurality of second analog signals, wherein the remote processing node is further configured to adaptably select one or more of the plurality of second analog signals based on information from an external source, wherein the combiner is configured to measure a phase shift in each of a plurality of adaptably selected second analog signals, feedback a corresponding phase shift to a corresponding digital-to-analog converter that determines the corresponding delay based on the corresponding phase shift, and coherently combine the plurality of adaptably selected second analog signals for processing by the modem, wherein the remote processing node further comprises: a splitter, and a plurality of analog-to-digital converters, wherein the modem is configured to generate an information signal, wherein the splitter is configured to split the information signal in a plurality of third analog signals, and each analog-to-digital converter is configured to convert a third analog signal to a third digital signal, and wherein the third digital signal is transmitted to a corresponding teleport that is configured to apply the corresponding delay to the third digital signal prior to transmission to the transceiver.

2. The system of solution 1, wherein the transceiver is located on a satellite.

3. The system of solution 2, wherein the satellite is configured to receive the subsequent transmission and forward the subsequent transmission to an airplane.

4. The system of solution 3, wherein the subsequent transmission is used by an in-flight entertainment (IFE) system in the airplane.

5. The system of solution 2, wherein the subsequent transmission comprises a fourth analog signal that is generated by converting the third digital signal at a respective teleport after the corresponding delay has been applied, and wherein the transceiver is configured to coherently receive the fourth analog signal from each of the plurality of teleports.

6. The system of solution 5, wherein a power level for the antenna element at the respective teleport is phase matched based on a corresponding fourth analog signal.

7. The system of any of solutions 1 to 6, wherein the transceiver is located on an airplane, and the subsequent transmission is used by an in-flight entertainment (IFE) system in the airplane.

8. The system of any of solutions 1 to 7, wherein the plurality of teleports is distributed over a geographic area, and wherein a range of values for the corresponding delay for the plurality of digital-to-analog converters is based on a size of the geographic area that ranges from 10 m$^2$ to 10 km$^2$.

9. The system of any of solutions 1 to 8, wherein at least one of the plurality of fiber optic cables is a 10 Gbps fiber optic cable, and wherein the combiner is communicatively coupled to the modem using a coaxial cable.

10. A system for wireless communication, comprising: a plurality of teleports, wherein each teleport comprises an antenna element and a processor, wherein at least one of the plurality of teleports is a redundant teleport, wherein the processor is configured to convert a first digital signal of a plurality of first digital signals into a first analog signal of a plurality of first analog signals, wherein each of the plurality of first analog signals has a corresponding phase shift, and wherein the antenna element is configured to transmit the first analog signal; and a remote processing node, which is located in a location that is remote from the plurality of teleports, configured to determine a corresponding delay in a second digital signal of a plurality of second digital signals from the corresponding phase shift, wherein the plurality of second digital signals corresponds to a plurality of second analog signals received by the plurality of teleports, wherein the remote processing node is further configured to (a) adaptively select or deselect at least one of the plurality of teleports in response to one or more failure or weather events and (b) adaptably select one or more of a plurality of third analog signals based on information from an external source, wherein the corresponding delay is determined based on coherently combining a plurality of adaptably selected third analog signals, and wherein each of the plurality of adaptably selected third analog signals is generated by converting a corresponding second digital signal of a plurality of adaptably selected second digital signals.

11. The system of solution 10, wherein the plurality of teleports is distributed over a geographic area, wherein a range of values for the corresponding delay is based on a size of the geographic area, and wherein the size of the geographic area ranges from 10 m$^2$ to 10 km$^2$.

12. The system of solution 10, wherein a diameter of the antenna element ranges from 2 m to 4 m, and wherein the antenna element is secured using a non-penetrating roof mount.

13. The system of any of solutions 10 to 12, wherein each of the plurality of second digital signals is converted to a corresponding third analog signal using a corresponding digital-to-analog converter (DAC), and wherein the DAC determines the corresponding delay based on receiving a feedback signal comprising a value of the corresponding phase shift.

14. The system of any of solutions 10 to 13, wherein each of the plurality of teleports is communicatively coupled to the remote processing node using a fiber optic cable that is configured to support a throughput of up to 10 Gbps.

15. A method of configuring a telecommunications system, comprising: converting, at each teleport of a plurality of teleports, one first digital signal of a plurality of first digital signals into a corresponding first analog signal of a plurality of first analog signals, wherein each of the plurality of first analog signals has a corresponding phase shift, wherein at least one of the plurality of teleports is a redundant teleport, and wherein a remote processing node is configured to adaptively select or deselect at least one of the plurality of teleports in response to one or more failure or weather events; and transmitting, by each adaptively selected teleport, the corresponding first analog signal, wherein the remote processing node, which is located in a location that is remote from the plurality of teleports, is further configured to (a) determine a corresponding delay in a second digital signal of a plurality of second digital signals from the corresponding phase shift and (b) adaptably select one or more of a plurality of third analog signals based on information from an external source, wherein the plurality of second digital signals corresponds to a plurality of second analog signals received by the plurality of teleports, wherein the corresponding delay is determined based on coherently combining a plurality of adaptably selected third analog signals, and wherein each of the plurality of adaptably selected third analog signals is generated by converting a corresponding second digital signal of a plurality of adaptably selected second digital signals.

16. The method of solution 15 or 16, further comprising: receiving, via a fiber optic cable, the one first digital signal, wherein the fiber optic cable that is configured to support a throughput of up to 10 Gbps.

17. The method of solution 15, further comprising: receiving, by each teleport from a satellite, a corresponding second analog signal.

18. The method of solution 17, wherein the satellite is configured to receive a signal comprising the plurality of first analog signals that have coherently combined.

19. The method of any of solutions 15 to 18, wherein the plurality of teleports is distributed over a geographic area that spans at least two microclimates, wherein a size of the geographic area ranges from 1 km$^2$ to 100 km$^2$.

20. The method of any of solutions 15 to 19, wherein each teleport comprises an antenna element that has a diameter between 2 m to 4 m, and is secured using a non-penetrating roof mount.

In some implementations, the machine learning/AI applications may compile coded descriptions into lower-level structured data objects that a machine can more readily understand, build a network topology of the main problem concept and sub-concepts covering aspects of the problem to be solved, train codified instantiations of the sub-concepts and main concept, and execute a trained AI model containing one, two, or more neural networks. The machine learning/AI applications can abstract away and automate the low-level mechanics of AI, and the machine learning/AI applications can manage and automate much of the lower-level complexities of working with AI. Each program developed in a pedagogical programming language can be fed into the machine learning/AI applications to generate and train appropriate intelligence models. The machine learning/AI applications can be a cloud-hosted platform configured to manage complexities inherent to training AI networks. Thus, the machine learning/AI applications can be accessible with one or more client-side interfaces to allow third parties to submit a description of a problem in a pedagogical programming language and let the online AI engine build and generate a trained intelligence model for one or more of the third parties. In some implementations, the machine learning/AI applications can be employed to algorithms, e.g., selecting the satellite from a group of satellites, evaluating saved resources and managing the use of the saved resources for other services than the video streaming services, and/or providing updates to the satellite information for the ground server, etc.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware, or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described, and other implementations, enhancements and variations can be made based on what is described and illustrated in this patent document.

What is claimed is:

1. A system for wireless communication, comprising:
a plurality of teleports,
wherein each teleport comprises an antenna element and a processor,
wherein at least one of the plurality of teleports is a redundant teleport, and
wherein the antenna element is configured to receive a first analog signal from a transceiver, and the processor is configured to convert the first analog signal into a first digital signal of a plurality of first digital signals; and
a remote processing node that is located in a location that is remote from the plurality of teleports, comprising:
a modem,
a plurality of digital-to-analog converters, and
a combiner,
wherein the remote processing node is configured to (a) adaptively select or deselect at least one of the plurality of teleports in response to one or more failure or weather events, and (b) receive the plurality of first digital signals from adaptively selected teleports over each of a plurality of fiber optic cables,
wherein a digital-to-analog converter is configured to delay the first digital signal by a corresponding delay and convert a delayed first digital signal to a second analog signal of a plurality of second analog signals,
wherein the remote processing node is further configured to adaptably select one or more of the plurality of second analog signals based on information from an external source,
wherein the combiner is configured to measure a phase shift in each of a plurality of adaptably selected second analog signals, feedback a corresponding phase shift to a corresponding digital-to-analog converter that determines the corresponding delay based on the corresponding phase shift, and coherently combine the plurality of adaptably selected second analog signals for processing by the modem,
wherein the remote processing node further comprises:
a splitter, and
a plurality of analog-to-digital converters,
wherein the modem is configured to generate an information signal,
wherein the splitter is configured to split the information signal in a plurality of third analog signals, and each analog-to-digital converter is configured to convert a third analog signal to a third digital signal, and
wherein the third digital signal is transmitted to a corresponding teleport that is configured to apply the corresponding delay to the third digital signal prior to transmission to the transceiver.

2. The system of claim 1, wherein the transceiver is located on a satellite.

3. The system of claim 2, wherein the satellite is configured to receive the subsequent transmission and forward the subsequent transmission to an airplane.

4. The system of claim 3, wherein the subsequent transmission is used by an in-flight entertainment (IFE) system in the airplane.

5. The system of claim 2, wherein the subsequent transmission comprises a fourth analog signal that is generated by converting the third digital signal at a respective teleport after the corresponding delay has been applied, and wherein the transceiver is configured to coherently receive the fourth analog signal from each of the plurality of teleports.

6. The system of claim 5, wherein a power level for the antenna element at the respective teleport is phase matched based on a corresponding fourth analog signal.

7. The system of claim 1, wherein the transceiver is located on an airplane, and the subsequent transmission is used by an in-flight entertainment (IFE) system in the airplane.

8. The system of claim 1, wherein the plurality of teleports is distributed over a geographic area, and wherein a range of values for the corresponding delay for the plurality of digital-to-analog converters is based on a size of the geographic area that ranges from 10 m$^2$ to 10 km$^2$.

9. The system of claim 1, wherein at least one of the plurality of fiber optic cables is a 10 Gbps fiber optic cable, and wherein the combiner is communicatively coupled to the modem using a coaxial cable.

10. A system for wireless communication, comprising:
a plurality of teleports,
wherein each teleport comprises an antenna element and a processor,
wherein at least one of the plurality of teleports is a redundant teleport,
wherein the processor is configured to convert a first digital signal of a plurality of first digital signals into a first analog signal of a plurality of first analog signals, wherein each of the plurality of first analog signals has a corresponding phase shift, and wherein the antenna element is configured to transmit the first analog signal; and
a remote processing node, which is located in a location that is remote from the plurality of teleports, configured to determine a corresponding delay in a second digital signal of a plurality of second digital signals from the corresponding phase shift,
wherein the plurality of second digital signals corresponds to a plurality of second analog signals received by the plurality of teleports,
wherein the remote processing node is further configured to (a) adaptively select or deselect at least one of the plurality of teleports in response to one or more failure or weather events and (b) adaptably select one or more of a plurality of third analog signals based on information from an external source,
wherein the corresponding delay is determined based on coherently combining a plurality of adaptably selected third analog signals, and
wherein each of the plurality of adaptably selected third analog signals is generated by converting a corresponding second digital signal of a plurality of adaptively selected second digital signals.

11. The system of claim 10, wherein the plurality of teleports is distributed over a geographic area, wherein a range of values for the corresponding delay is based on a size of the geographic area, and wherein the size of the geographic area ranges from 10 m$^2$ to 10 km$^2$.

12. The system of claim 10, wherein a diameter of the antenna element ranges from 2 m to 4 m, and wherein the antenna element is secured using a non-penetrating roof mount.

13. The system of claim 10, wherein each of the plurality of second digital signals is converted to a corresponding third analog signal using a corresponding digital-to-analog converter (DAC), and wherein the DAC determines the corresponding delay based on receiving a feedback signal comprising a value of the corresponding phase shift.

14. The system of claim 10, wherein each of the plurality of teleports is communicatively coupled to the remote processing node using a fiber optic cable that is configured to support a throughput of up to 10 Gbps.

15. A method of configuring a telecommunications system, comprising:
converting, at each teleport of a plurality of teleports, one first digital signal of a plurality of first digital signals into a corresponding first analog signal of a plurality of first analog signals, wherein each of the plurality of first analog signals has a corresponding phase shift, wherein at least one of the plurality of teleports is a redundant teleport, and wherein a remote processing node is configured to adaptively select or deselect at least one of the plurality of teleports in response to one or more failure or weather events; and
transmitting, by each adaptively selected teleport, the corresponding first analog signal,
wherein the remote processing node, which is located in a location that is remote from the plurality of teleports, is further configured to (a) determine a corresponding delay in a second digital signal of a plurality of second digital signals from the corresponding phase shift and (b) adaptably select one or more of a plurality of third analog signals based on information from an external source,
wherein the plurality of second digital signals corresponds to a plurality of second analog signals received by the plurality of teleports,
wherein the corresponding delay is determined based on coherently combining a plurality of adaptably selected third analog signals, and
wherein each of the plurality of adaptably selected third analog signals is generated by converting a corresponding second digital signal of a plurality of adaptively selected second digital signals.

16. The method of claim 15, further comprising:
receiving, via a fiber optic cable, the one first digital signal, wherein the fiber optic cable that is configured to support a throughput of up to 10 Gbps.

17. The method of claim 15, further comprising:
receiving, by each teleport from a satellite, a corresponding second analog signal.

18. The method of claim 17, wherein the satellite is configured to receive a signal comprising the plurality of first analog signals that have coherently combined.

19. The method of claim 15, wherein the plurality of teleports is distributed over a geographic area that spans at least two microclimates, wherein a size of the geographic area ranges from 1 km$^2$ to 100 km$^2$.

20. The method of claim 15, wherein each teleport comprises an antenna element that has a diameter between 2 m to 4 m, and is secured using a non-penetrating roof mount.

* * * * *